(12) United States Patent
Lee et al.

(10) Patent No.: US 11,664,024 B2
(45) Date of Patent: May 30, 2023

(54) ARTIFICIAL INTELLIGENCE DEVICE

(71) Applicant: LG ELECTRONICS INC., Seoul (KR)

(72) Inventors: Hyangjin Lee, Seoul (KR); Myeongok Son, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 16/998,970

(22) Filed: Aug. 20, 2020

(65) Prior Publication Data
US 2021/0375279 A1 Dec. 2, 2021

(30) Foreign Application Priority Data
May 29, 2020 (KR) .......................... 10-2020-0065268

(51) Int. Cl.
*G10L 15/02* (2006.01)
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
None
See application file for complete search history.

(56) References Cited

U.S. PATENT DOCUMENTS

| | | | |
|---|---|---|---|
| 6,397,186 B1* | 5/2002 | Bush ....................... | G06F 3/167 |
| | | | 704/E15.044 |
| 9,407,675 B1* | 8/2016 | Ludwig ............. | H04N 5/23238 |
| 9,875,740 B1* | 1/2018 | Kumar .................... | G10L 15/10 |
| 10,013,978 B1* | 7/2018 | Bhaya ................. | G06F 16/3344 |
| 10,147,441 B1* | 12/2018 | Pogue .................... | H04R 3/005 |
| 10,602,276 B1* | 3/2020 | Kirsch ................... | H04R 3/005 |
| 10,867,599 B2* | 12/2020 | Rastogi .................. | G10L 15/18 |
| 10,971,173 B2* | 4/2021 | Kothari ................. | G06N 20/00 |
| 2017/0004828 A1* | 1/2017 | Lee ........................ | G06F 3/012 |
| 2017/0076720 A1* | 3/2017 | Gopalan ................ | G10L 15/22 |
| 2017/0083285 A1* | 3/2017 | Meyers ................... | G10L 15/00 |
| 2018/0040324 A1* | 2/2018 | Wilberding ............ | G06F 3/167 |
| 2018/0114531 A1 | 4/2018 | Kumar et al. | |
| 2018/0293484 A1* | 10/2018 | Wang .................... | G06F 16/632 |
| 2018/0301147 A1* | 10/2018 | Kim ........................ | G10L 15/02 |
| 2018/0322870 A1* | 11/2018 | Lee ..................... | H04N 21/4394 |

(Continued)

OTHER PUBLICATIONS

European Patent Office Application Serial No. 20189824.4, Search Report dated Jan. 27, 2021, 12 pages.

*Primary Examiner* — Seong-Ah A Shin
(74) *Attorney, Agent, or Firm* — Lee Hong Degerman Kang & Waimey

(57) ABSTRACT

An artificial intelligence device may receive first voice data corresponding to first voice uttered by a user from a first peripheral device, acquire a first intention corresponding to the first voice data, transmit a first search result corresponding to the first intention to the first peripheral device, receive second voice data corresponding to second voice uttered by the user from a second peripheral device, acquire a second intention corresponding to the received second voice data, and transmit a search result corresponding to the second intention to the second peripheral device depending on whether the second intention is an interactive intention associated with the first intention.

5 Claims, 14 Drawing Sheets

(56) References Cited

U.S. PATENT DOCUMENTS

| 2018/0342243 | A1* | 11/2018 | VanBlon | G06F 3/167 |
| 2019/0132265 | A1* | 5/2019 | Nowak-Przygodzki | |
| | | | | H04L 51/02 |
| 2019/0179611 | A1* | 6/2019 | Wojogbe | H04R 3/04 |
| 2020/0066279 | A1* | 2/2020 | Kang | G10L 15/20 |
| 2020/0213193 | A1* | 7/2020 | Newell | H04W 4/70 |

* cited by examiner

Living room
---
Main room

ARTIFICIAL INTELLIGENCE DEVICE

CROSS-REFERENCE TO RELATED APPLICATION

Pursuant to 35 U.S.C. § 119(a), this application claims the benefit of earlier filing date and right of priority to Korean Patent Application No. 10-2020-0065268, filed on May 29, 2020, the contents of which are all hereby incorporated by reference herein in their entirety.

BACKGROUND

The present disclosure relates to provision of a voice recognition service through a plurality of artificial intelligence agents.

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing the program and viewing time. IPTV, smart TV service may provide a variety of additional services, such as Internet search, home shopping, and online games based on this bidirectionality.

Recently, a lot of technologies for recognizing a user's utterance and providing a voice recognition service according to the user's utterance using artificial intelligence have emerged.

In general, a display device is equipped with a plurality of artificial intelligence (AI) agents capable of providing a voice recognition service.

Devices connected to a TV to allow voice recognition input, such as magic remote controllers, TV Build-in (remote voice recognition) or IoT speaker devices, are being very diversified.

At this time, interactive utterances for voice recognition generated by each device are independently managed, because voice recognition service providers according to speech input may be different.

In addition, since a device with a user interface (UI) such as a TV and a device without a UE (e.g., IoT speaker) coexist, it is difficult to provide an interactive service.

SUMMARY

An object of the present disclosure is to organically manage utterances generated by a plurality of external devices connected to a display device.

Another object of the present disclosure is to provide a voice recognition service for interactive utterances between peripheral devices having different voice recognition service providers.

Another object of the present disclosure is to provide a voice recognition service for interactive utterances between a device capable of providing a user interface screen and a device incapable of providing a user interface screen.

An artificial intelligence device according to an embodiment of the present disclosure may receive first voice data corresponding to first voice uttered by a user from a first peripheral device, acquire a first intention corresponding to the first voice data, transmit a first search result corresponding to the first intention to the first peripheral device, receive second voice data corresponding to second voice uttered by the user from a second peripheral device, acquire a second intention corresponding to the received second voice data, and transmit a search result corresponding to the second intention to the second peripheral device depending on whether the second intention is an interactive intention associated with the first intention.

An artificial intelligence device according to another embodiment of the present disclosure may include a communication interface configured to perform communication with a first peripheral device and a second peripheral device, the first peripheral device receiving first voice data corresponding to first voice uttered by a user and the second peripheral device receiving the first voice data from the first peripheral device and second voice data corresponding to second voice uttered by the user, and a processor configured to receive the first voice data from the second peripheral device, acquire a first intention corresponding to the first voice data, transmit a first search result corresponding to the first intention to the second peripheral device, receive the second voice data from the second peripheral device, acquire a second intention corresponding to the received second voice data, and transmit a search result corresponding to the second intention to the second peripheral device depending on whether the second intention is an interactive intention associated with the first intention.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
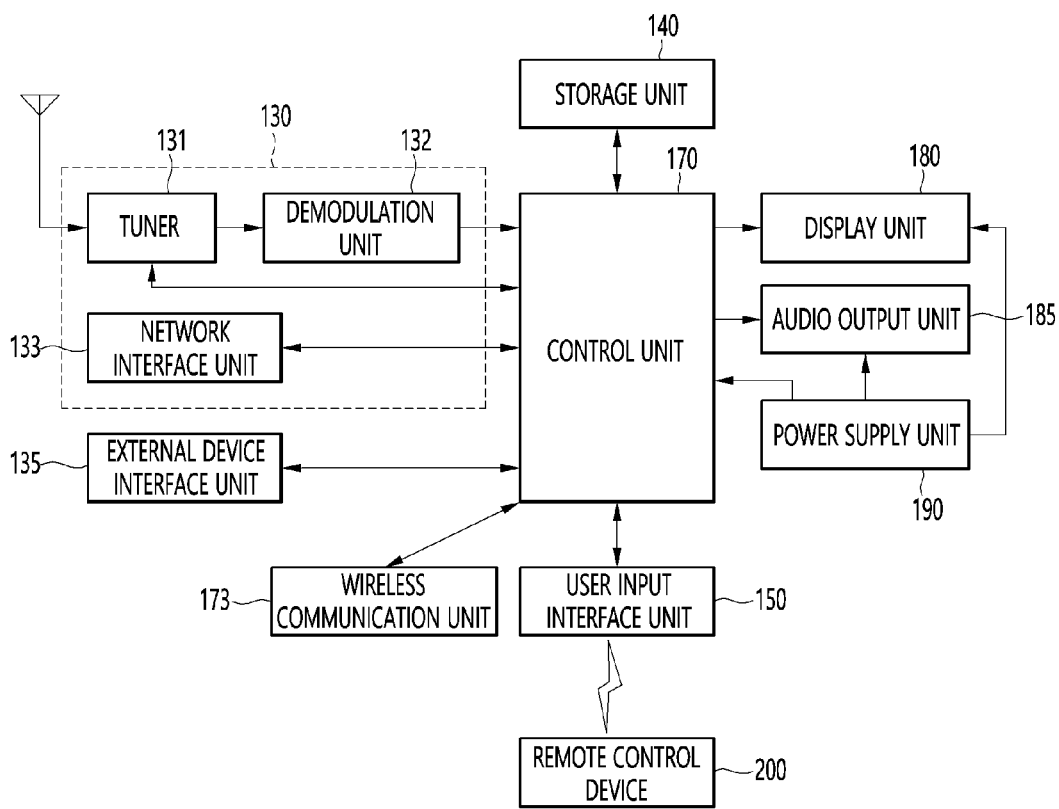
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A voice signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. In other words, the network interface unit 133 can transmit or receive data to or from a corresponding server by accessing a predetermined webpage through the network.

Then, the network interface unit 133 can receive contents or data provided from a content provider or a network operator. In other words, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not illustrated) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

The wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
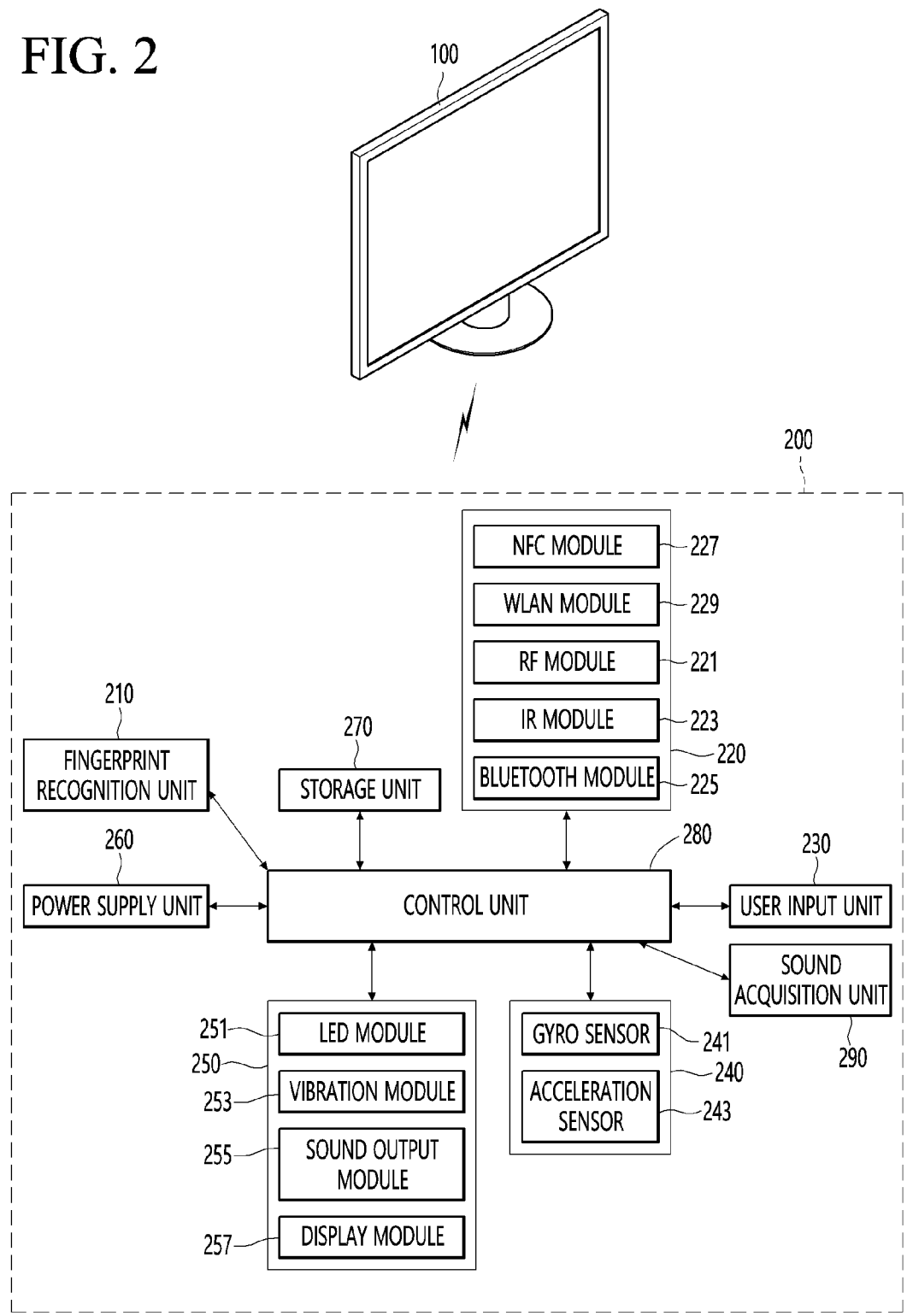
FIG. 2 is a block diagram illustrating a remote control device according to an embodiment of the present disclosure.
Figure 3:
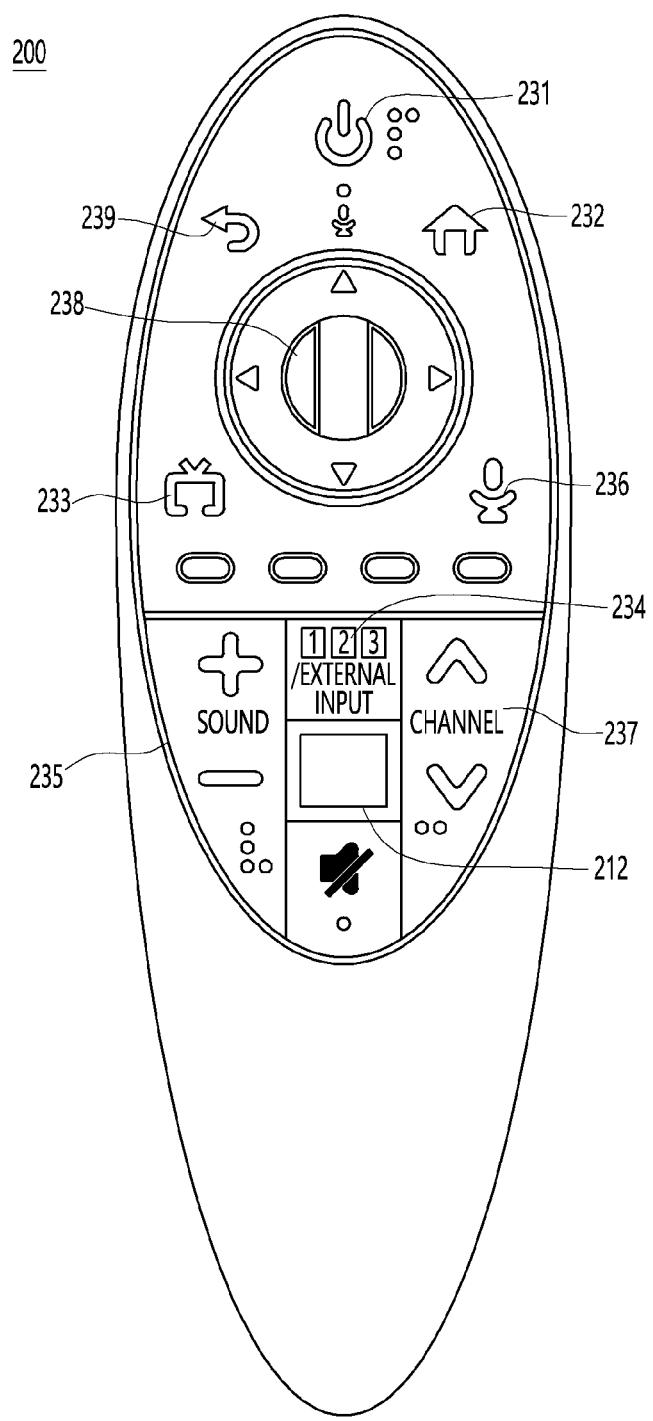
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
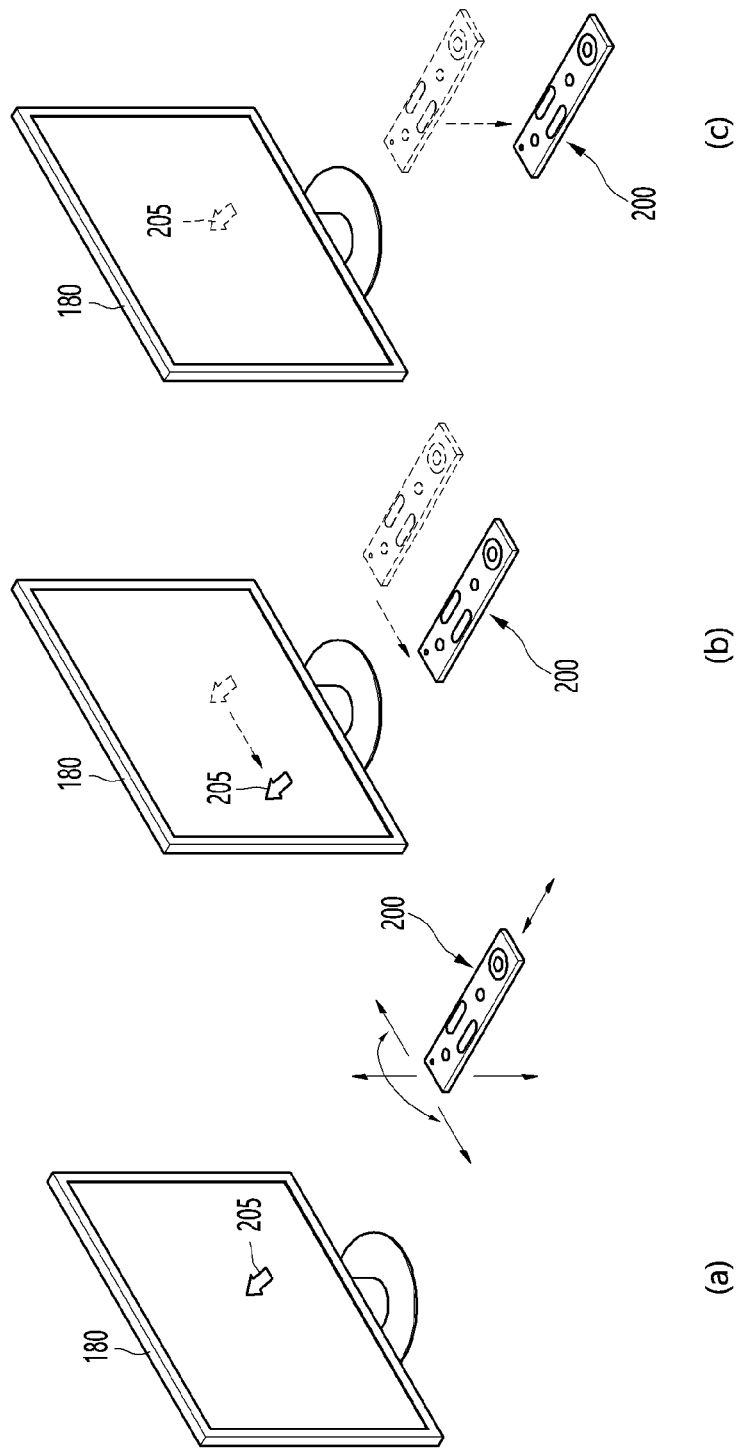
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the contrary, if the user moves the remote control device 200 to approach the display unit 180, the selection area in the display unit 180 corresponding to the pointer 205 may be zoomed out and reduced.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. In other words, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
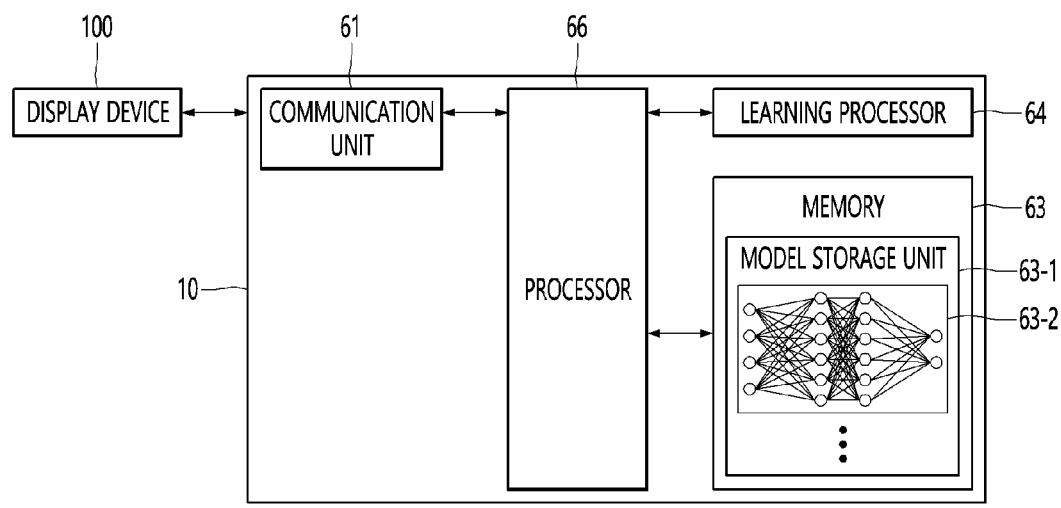
FIG. 5 is a block diagram illustrating a configuration of an AI server according to an embodiment of the present disclosure.

FIG. 5 is a block diagram illustrating a configuration of an AI server according to an embodiment of the present disclosure.

Referring to FIG. 5, the Artificial Intelligence (AI) server 10 may refer to a device for learning artificial neural network using a machine learning algorithm or using learned artificial neural network.

Here, the AI server 10 may be composed of a plurality of servers to perform distributed processing or may be defined as a 5G network. In this case, the AI server 10 may be included as a portion of the display device 100 to perform at least some of the AI processing together.

The AI server 10 may include a communication unit 61, a memory 63, a learning processor 64, a processor 66, and the like.

The communication unit 61 may transmit/receive data with an external device such as the display device 100.

The memory 63 may include a model storage unit 63-1. The model storage unit 63-1 may store the training or trained model (or artificial neural network 63-2) through the learning processor 64.

The learning processor 64 may train the artificial neural network 63-2 using the training data. The training model may be used in a state of being mounted in the AI server 10 of the artificial neural network or may be mounted and used in an external device such as the display device 100.

The training model can be implemented in hardware, software or a combination of hardware and software. If some or all of the training model is implemented in software, one or more instructions constituting the training model may be stored in the memory 63.

The processor 66 may infer a result value with respect to the new input data using the training model, and generate a response or control command based on the inferred result value.

Figure 6:
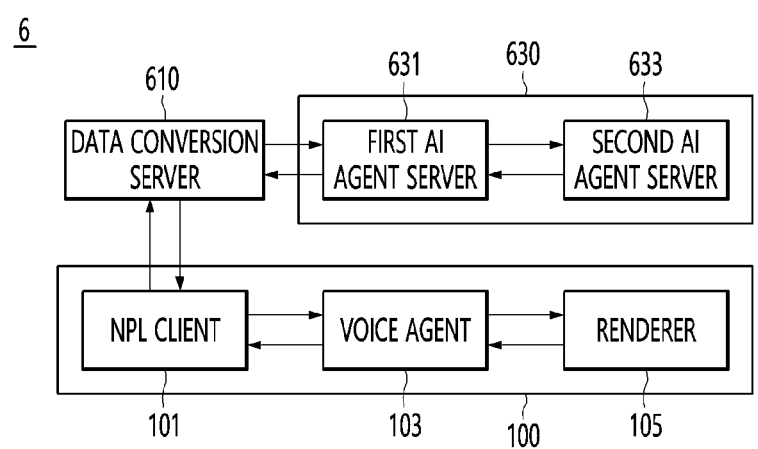
FIG. 6 is a view for describing the configuration of an artificial intelligence system according to another embodiment of the present disclosure.

FIG. 6 is a view for describing the configuration of an artificial intelligence system according to another embodiment of the present disclosure.

Referring to FIG. 6, the artificial intelligence system 6 may include a display device 100, a data conversion server 610, and an NLP server 630.

The display device 100 may transmit voice data corresponding to the voice command uttered by the user to the data conversion server 610.

The data conversion server 610 may receive voice data from the display device 100. The data conversion server 610 may convert the received voice data into text data.

The data conversion server 610 may convert the result of performing the intention in the form of text received from the NLP server 630 into voice data in the form of audio, and transmit the converted voice data to the display device 100.

The data conversion server 610 may transmit voice data indicating the AI agent change to the display device 100.

The natural language process (NLP) server 630 may include a first AI agent server 631 and a second AI agent server 633.

The NLP server 630 may receive text data from the data conversion server 610 and analyze the intention of the received text data using the natural language processing engine.

The NLP server 630 may include one or more AI agent servers.

For example, the NLP server 630 may include a first AI agent server 631 and a second AI agent server 633. The first AI agent server 631 may be a server that provides a natural language processing service through a manufacturer other than the manufacturer of the display device 100.

The second AI agent server 633 may be a server that provides natural language processing services through the manufacturer of the display device 100.

Each of the first AI agent server 631 and the second AI agent server 633 may include components of the AI server 10 illustrated in FIG. 5.

The data conversion server 610 may transmit text data to the first AI agent server 631.

The first AI agent server 631 may obtain the intention of the text data and determine whether to process an operation corresponding to the obtained intention.

If it is determined that the first AI agent server 631 can process an operation corresponding to the obtained intention, the first AI agent server 631 may obtain an intention analysis result corresponding to the intention.

If it is determined that the first AI agent server 631 cannot process an operation corresponding to the obtained intention, the first AI agent server 631 may transmit the intention of the text data to the second AI agent server 633.

The second AI agent server 633 may obtain an intention analysis result corresponding to the intention of the received text data, and transmit the obtained intention analysis result to the first AI agent server 631.

The first AI agent server 631 may transmit the intention analysis result to the data conversion server 610.

The data conversion server 610 may transmit the intention analysis result to the NLP client 101 of the display device 100.

The display device 100 may further include an NLP client 101, a voice agent 103, and a renderer 105.

The NLP client 101, the voice agent 103, and the renderer 105 may be included in the control unit 170 illustrated in FIG. 1.

As another example, the NLP client 101 may be included in the network interface unit 133 illustrated in FIG. 1.

The NLP client 101 may communicate with the data conversion server 610.

The voice agent 103 may receive a signal for entering the voice recognition mode from the remote control device 200 and activate operation of a microphone provided in the display device 100 according to the received signal.

The voice agent 103 may transmit the voice command received from the microphone included in the display device 100 or the voice command received from the remote control device 200 to the NLP client 101.

The voice agent 103 may receive intention analysis result information or search information received by the NLP client 101 from the NLP server 630.

The voice agent 103 may execute an application or perform a function corresponding to a button key of the remote control device 200 based on the intention analysis result information.

The voice agent 103 may be included in the configuration of the NLP client 103.

The renderer 105 may generate a UI through the GUI module to display the received search information on the display unit 180 and output the generated UI to the display unit 180.

Figure 7:
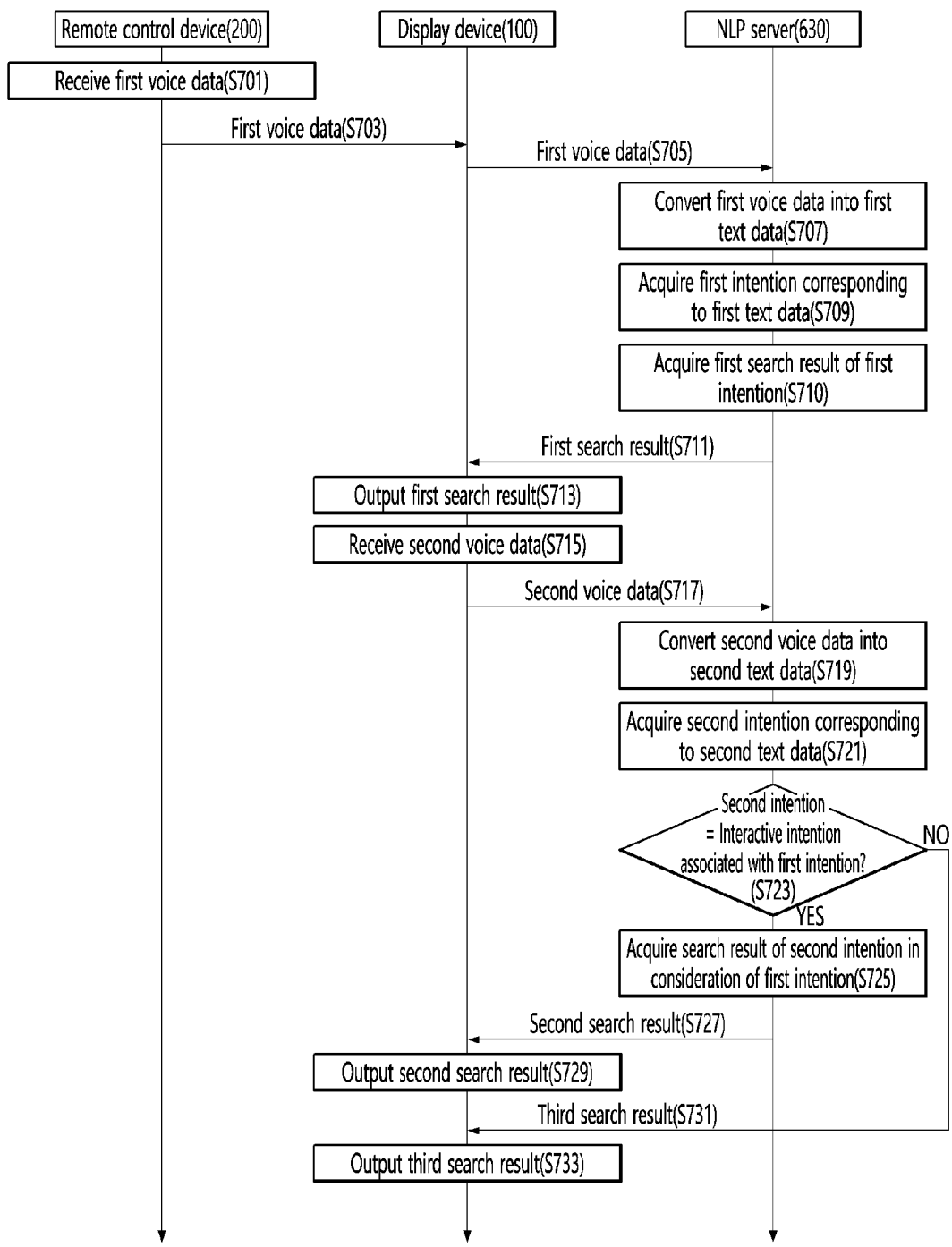
FIG. 7 is a ladder diagram for a method of operating an artificial intelligence system according to an embodiment of the present disclosure.

FIG. 7 is a ladder diagram illustrating a method of operating an artificial intelligence system according to an embodiment of the present disclosure.

Hereinafter, the method of operating the system according to the embodiment of the present disclosure will be described with reference to FIGS. 5 and 6.

In addition, hereinafter, an AI agent may be hardware or software capable of recognizing a voice command uttered by a user and providing information according to the intention of the recognized voice command.

The display device 100 or the NLP server 630 may include a plurality of AI agents.

Meanwhile, some of the steps of FIG. 7 may be simultaneously performed or the order of some steps may be changed.

FIG. 7 is a ladder diagram illustrating a method of operating a voice recognition service system according to an embodiment of the present disclosure.

In FIG. 7, the remote control device 200 and the display device 100 may operate through the same user account.

Referring to FIG. 7, the remote control device 200 receives first voice data corresponding to first voice uttered by a user through a microphone provided in the remote control device 200 (S701), and transmits the received first voice data to the display device 100 (S703).

The first voice data may include device identification information for identifying a device for generating (or directly receiving) the first voice data. That is, the device identification information may be information for identifying a peripheral device.

As another example, the display device 100 may transmit the device identification information along with the first voice data, separately from the first voice data.

The display device 100 transmits the first voice data received from the remote control device 200 to the NLP server 630 (S705).

The control unit 170 of the display device 100 may transmit the first voice data to the NLP server 630 through the network interface unit 133. That is, the first voice data may be transmitted to the NLP server 630, in order to grasp the utterance intention of the user.

The display device 100 may determine an AI agent server which will transmit the first voice data, based on the identification information of a device, which has directly received the first voice data.

The AI agent server may be matched with the remote control device 200 or the display device 100.

For example, when the remote control device 200 is matched with the first AI agent server 631, the control unit 170 of the display device 100 may transmit the first voice data to the first AI agent server 631 matched with the remote control device 200 among the plurality of AI agent servers. Alternatively, this may be performed by the data conversion server 610.

The second AI agent server 633 may be matched with the display device 100 as the provider of the voice recognition service. This will be described below.

The processor 66 of the NLP server 630 converts the first voice data into first text data (S707).

The processor 66 may convert the first voice data into first text data using a speech-to-text (STT) engine.

As another example, the display device 100 may transmit voice data to the data conversion server 610 shown in FIG. 6, and the data conversion server 610 may convert voice data into text data. In this case, the data conversion server 610 may transmit the converted text data to the NLP server 630.

The processor 66 of the NLP server 630 may determine the voice recognition service provider of the first voice data as the first AI agent server 631. This is because a device which has directly received the first voice data is the remote control device 200, and the first AI agent server 631 is predetermined as the voice recognition service provider of the voice received by the remote control device 200.

The processor 66 of the NLP server 630 acquires a first intention through intention analysis of the first text data (S709).

The processor 66 of the NLP server 630 may analyze the intention of the first text data using a natural language processing engine.

The processor 66 may sequentially perform a morpheme analysis step, a syntax analysis step, a speech-act analysis step, a dialog processing step with respect to text data, thereby analyzing the intention of the text data.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step, and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The processor 66 of the NLP server 630 acquires a first search result of the acquired first intention (S710).

The processor 66 of the NLP server 630 may search for the first intention after the dialog processing step, and acquire the first search result according to the result of search.

The processor 66 of the NLP server 630 may transmit the first intention to a search server (not shown) and receive the first search result corresponding to the first intention from the search server (not shown).

The search server (not shown) may be a server connected to a website to search for information corresponding to the first intention.

The processor 66 of the NLP server 630 transmits the acquired first search result to the display device 100 through the communication unit 61 (S711).

The display device 100 outputs the first search result received from the NLP server 630 (S713).

The control unit 170 of the display device 100 may display the first search result received from the NLP server 630 on the display unit 180 or audibly output the first search result through the audio output unit 185.

Thereafter, the display device 100 receives second voice data corresponding to second voice uttered by the user through the microphone provided in the display device 100 (S715).

The device for receiving the first voice uttered by the user in step S701 may be a peripheral device and the device for receiving the second voice uttered by the user in step S715 may be the display device 100.

The display device 100 may be in a state capable of providing the voice recognition service before receiving the second voice. To this end, the display device 100 may be in a state of previously receiving a wake-up word for triggering the voice recognition service.

The display device 100 may be in an active state capable of providing a voice recognition service, by receiving the wake-up signal.

The display device 100 transmits the received second voice data to the NLP server 630 (S717).

The control unit 170 of the display device 100 may transmit the second voice data to the NLP server 530 through the network interface unit 133.

The second voice data may include the identification information of the display device 100, which has directly received or generated the second voice data.

The control unit 170 may transmit the identification information of the display device 100 to the NLP server 630, independently of the second voice data.

The control unit 170 may transmit the second voice data to the AI agent server matched therewith. For example, when the display device 100 is matched with the second AI agent server 631, the control unit 170 of the display device 100 may directly transmit the second voice data to the second AI agent server 631.

The processor 66 of the NLP server 630 converts the received second voice data into second text data (S719).

The processor 66 of the NLP server 630 may convert the second voice data into the second text data using the STT engine.

As another example, the display device 100 may transmit the second voice data to the data conversion server 610, and the data conversion server 610 may convert the second voice data into the second text data.

The data conversion server 610 may transmit the converted second text data to the NLP server 630.

The processor 66 of the NLP server 630 acquires a second intention corresponding to the second text data through intention analysis (S721).

The processor 66 may acquire the second intention corresponding to the second text data using a natural language processing engine.

The processor 66 of the NLP server 630 determines whether the acquired second intention is an interactive intention associated with the first intention (S723).

The processor 66 may compare the second intention with the first intention obtained before acquiring the second intention and determine whether the second intention is an interactive intention associated with the first intention.

The processor 66 may determine that the second intention is an interactive intention, when the second intention is connectable with the first intention.

The second intention connectable with the first intention may be an intention of requesting additional information of a keyword of the first text data corresponding to the first intention.

For example, when the first intention is search for a specific person's name, the interactive intention of the first intention may request search for movies starring the specific person.

As another example, when the first intention is search for today's weather information, the interactive intention of the first intention may request search for tomorrow's weather.

The interactive intention may be referred to as an interactive connection intention.

The processor 66 of the NLP server 630 acquires a second search result corresponding to the second intention in consideration of the first intention, upon determining that the acquired second intention is the interactive intention associated with the first intention (S725).

The processor 66 may perform search corresponding to the second intention using the first intention, upon determining that the second intention is the interactive intention of the first intention.

The processor 66 may acquire a second search result according to search.

The processor 66 of the NLP server 630 transmits the second search result to the display device 100 through the communication unit 61 (S727).

The display device 100 outputs the second search result received from the NLP server 630 (S729).

The control unit 170 of the display device 100 may display the second search result received from the NLP server 630 on the display unit 180 or may audibly output the second search result through the audio output unit 185.

Meanwhile, the processor 66 of the NLP server 630 acquires a third search result in consideration of only the second intention upon determining that the acquired second intention is not the interactive intention associated with the first intention, and transmits the acquired third search result to the display device 100 (S731).

The processor 66 may perform search corresponding to the second intention in consideration of only the second intention without considering the first intention, upon determining that the second intention is not the interactive intention associated with the first intention. The processor 66 may acquire the third search result considering only the second intention and transmit the acquired third search result to the display device 100.

The display device 100 outputs the third search result received from the NLP server 630 (S733).

The control unit 170 of the display device 100 may display the third search result on the display unit 180 or may audibly output the third search result through the audio output unit 185.

Hereinafter, the embodiment of FIG. 7 will be described according to an actual use scenario.

FIGS. 8 to 11 are views illustrating a process of providing an interactive voice recognition service when voice recognition service providers are different according to the embodiment of the present disclosure.

First, FIGS. 8 and 9 will be described.

Figure 8:
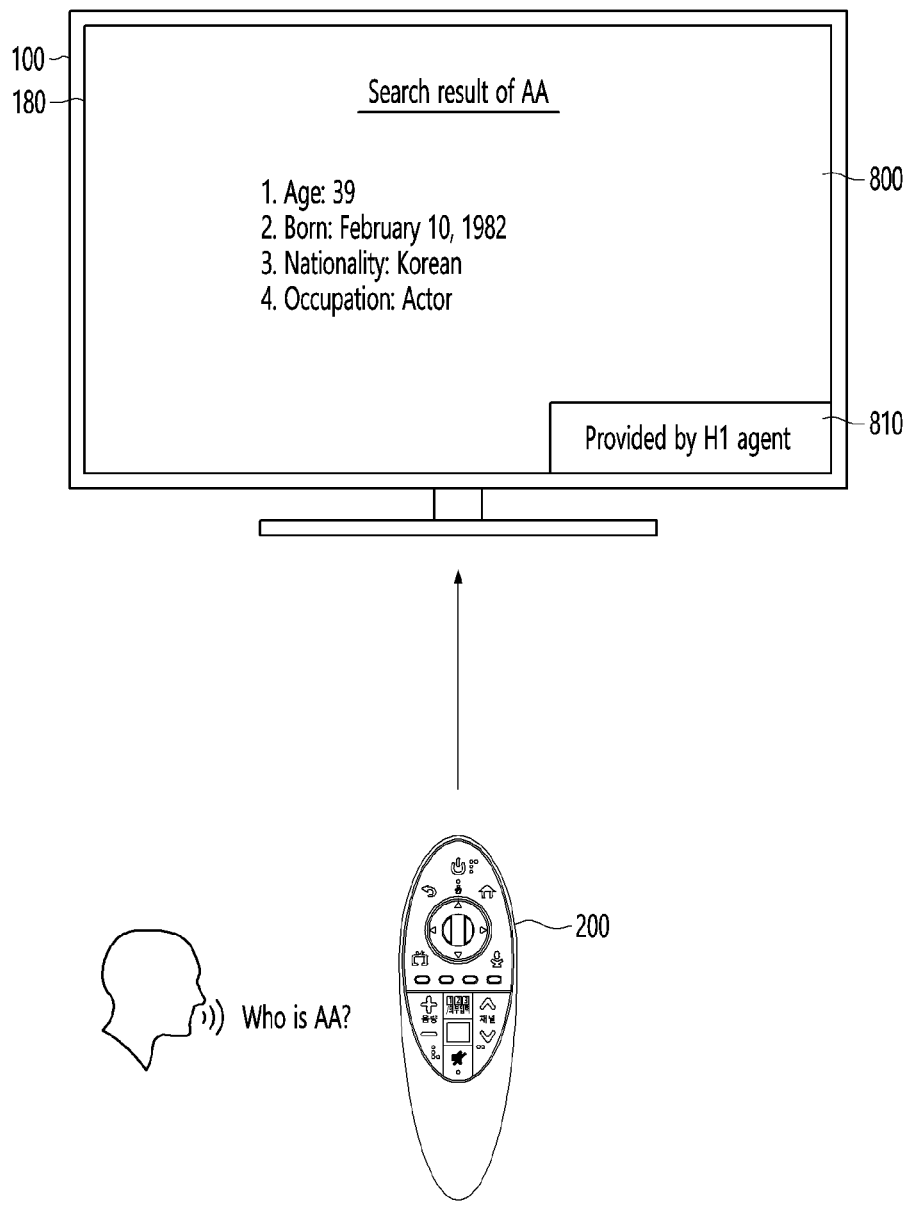
FIGS. 8 to 11 are views illustrating a process of providing an interactive voice recognition service when voice recognition service providers are different according to the embodiment of the present disclosure.
Figure 9:
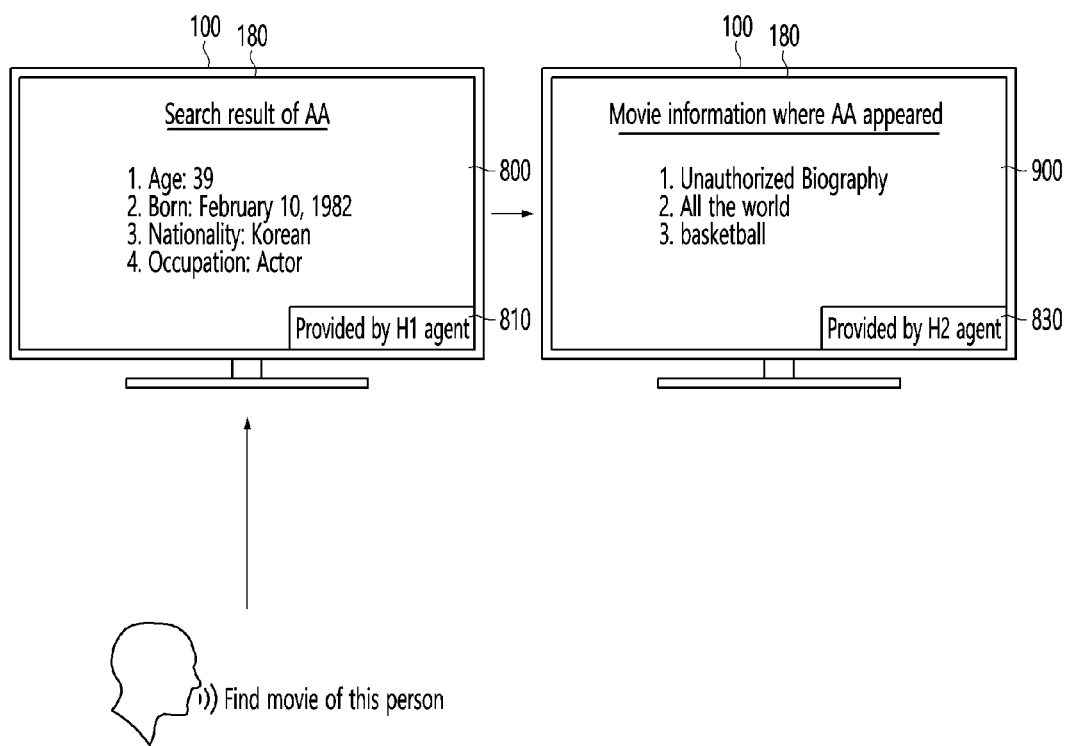

In FIGS. 8 and 9, it is assumed that the remote control device 200 and the display device 100 are located in the same space (e.g., a living room).

In FIGS. 8 and 9, it is assumed that the remote control device 200 provides a voice recognition service through the first AI agent server 631, and the display device 100 provides a voice recognition service through the second AI agent server 633.

The remote control device 200 may receive first voice <Who is AA?> uttered by the user through the microphone provided therein.

The remote control device 200 may transmit the first voice data corresponding to the first voice to the display device 100.

The display device 100 may transmit the received first voice data to the NLP server 630. The display device 100 may further transmit the source identifier (the identifier of the remote control device) of the first voice data to the NLP server 630.

The NLP server 630 may determine the voice recognition service provider of the first voice data as the first AI agent server 631, based on the source identifier of the first voice data.

The NLP server 630 may convert the first voice data into the first text data and acquire the first intention through intention analysis of the first text data.

The NLP server 630 may determine the first intention as a search request for the person <AA> through intention analysis.

The NLP server 630 may acquire the first search result through search for the person <AA> and transmit the acquired first search result to the display device 100.

The display device 100 may display the first search result 800 including search information of the person <AA> received from the NLP server 630 on the display unit 180.

Meanwhile, the display device 100 may further display a first indicator 810 indicating that the voice recognition service provider for the first voice is the first AI agent server 631 on the display unit 810. The first indicator 810 may identify the provider of the voice recognition service and may have various shapes such as text, an image or an icon.

The display device 100 may audibly output a notification indicating that the voice recognition service provider for the first voice is the first AI agent server 631.

The user may easily grasp who the provider of the voice recognition service is through the first indicator 810.

Thereafter, the user may move and then utter second voice <Find the movie of this person> in front of the display device 100, as shown in FIG. 9.

The display device 100 may receive the second voice data corresponding to the second voice through the microphone (not shown) provided in the display device 100.

The display device 100 may transmit the received second voice data and the source identifier of the second voice data to the NLP server 630.

The source identifier may include one or more of a model name and name for identifying a device.

The NLP server 630 may determine the voice recognition service provider as the second AI agent server 633, based on the source identifier of the second voice data.

The NLP server 630 may convert the second voice data into the second text data and acquire the second intention through intention analysis of the second text data.

The NLP server 630 may determine the second intention as a search request for movies starring the person through intention analysis.

The NLP server 630 may compare the second intention with the first intention obtained immediately before acquiring the second intention. The NLP server 630 may determine that the second intention is an interactive intention related to the person <AA>, because the first intention is a search request for the person <AA> and the second intention is a search request for a movie starring an unspecified person.

That is, the NLP server 630 may reinterpret the second intention of the second voice <Find the movie of this person> as a search request for the movie starring <AA>.

The NLP server 630 may acquire the second search result including the search information of the movie starring <AA> and transmit the acquired second search result to the display device 100.

The display device 100 may display the received second search result 900 through the display unit 180.

Simultaneously, the display device 100 may further display a second indicator 830 indicating that the voice recognition service provider for the second voice is the second AI agent server 633 on the display unit 180. The second indicator 830 may identify the provider of the voice recognition service and may have various shapes such as text, an image or an icon.

The display device 100 may audibly output a notification indicating that the voice recognition service provider for the second voice is the second AI agent server 633.

The user may easily grasp the provider of the voice recognition service through the second indicator 830.

According to the embodiment of the present disclosure, even if the voice recognition service providers which have received the voices continuously uttered by the user are different, it is possible to organically output the voice recognition result.

Therefore, the user may receive the organic voice recognition service even if the user utters voice toward any device in the home, it is possible to greatly improve convenience.

Next, FIGS. 10 and 11 will be described.

Figure 10:
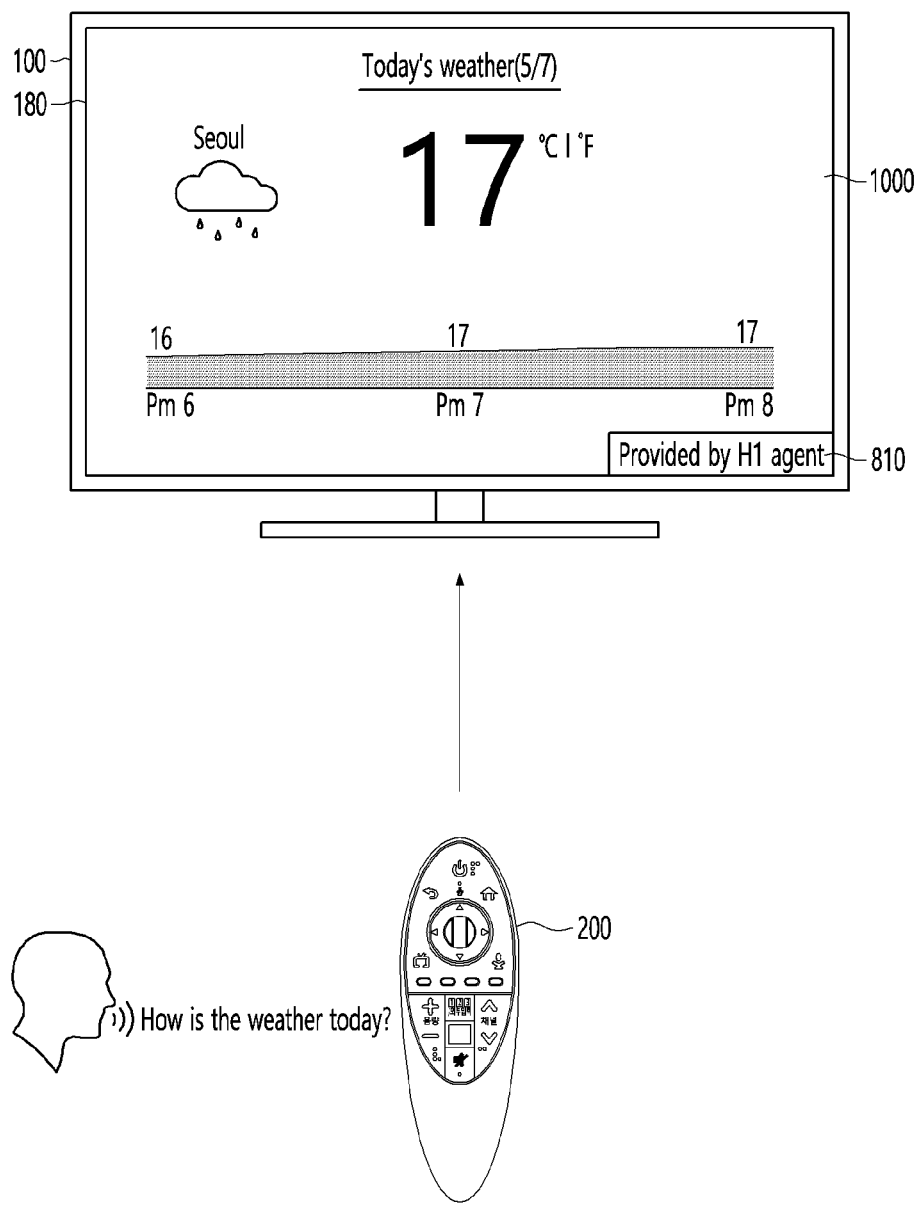
Figure 11:
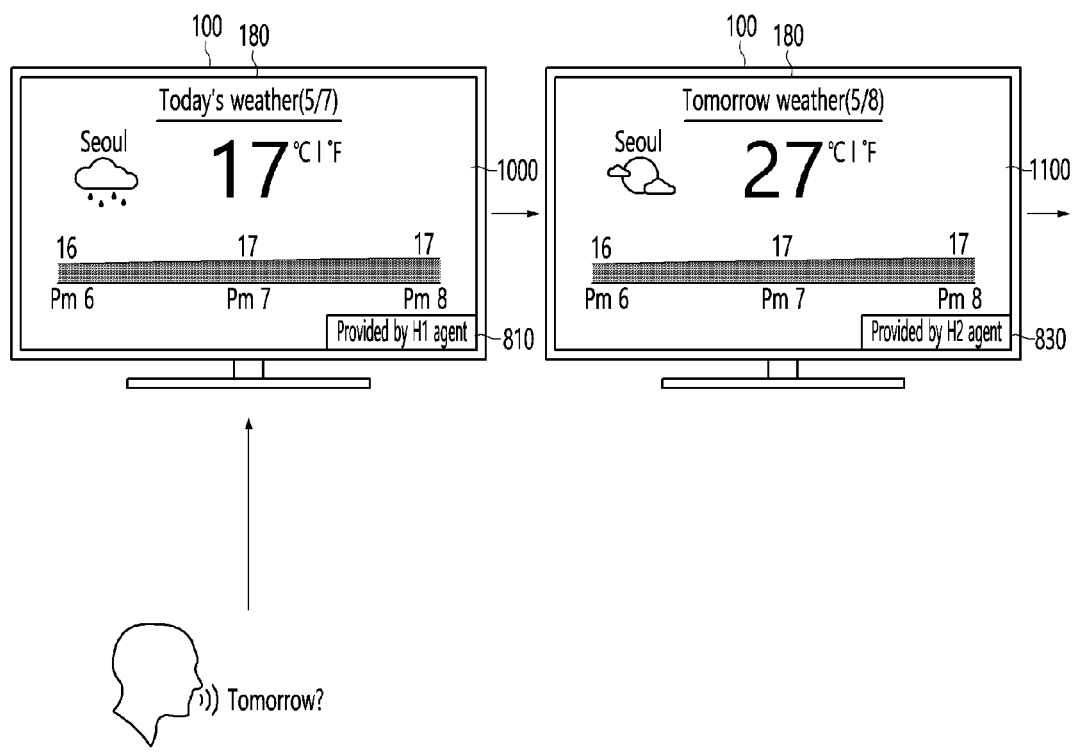

In FIGS. 10 and 11, it is assumed that the remote control device 200 and the display device 100 are located in the same space (e.g., a living room).

In FIGS. 10 and 11, it is assumed that the remote control device 200 provides a voice recognition service through the first AI agent server 631 and the display device 100 provides a voice recognition service through the second AI agent server 633.

The remote control device 200 may receive first voice <How is the weather today?> uttered by the user through the microphone provided therein.

The remote control device 200 may transmit the first voice data corresponding to the first voice to the display device 100.

The display device 100 may transmit the received first voice data to the NLP server 630. The display device 100 may further transmit the source identifier of the first voice data (the identifier of the remote control device) to the NLP server 630.

The NLP server 630 may determine the voice recognition service provider for the first voice data as the first AI agent server 631, based on the source identifier of the first voice data.

The NLP server 630 may convert the first voice data into first text data and acquire the first intention through intention analysis of the first text data.

The NLP server 630 may determine the first intention as a search request for today's weather through intention analysis.

The NLP server 630 may acquire the first search result including the search information of the today's weather and transmit the acquired first search result to the display device 100.

The display device 100 may display the first search result 1000 including the search information of the today's weather received from the NLP server 630 on the display unit 180.

Meanwhile, the display device 100 may further display a first indicator 810 indicating that the voice recognition service provider for the first voice is the first AI agent server 631 on the display unit 180. The first indicator 810 may identify the provider of the voice recognition service and may have various shapes such as text, an image or an icon.

The display device 100 may audibly output a notification indicating that the voice recognition service provider for the first voice is the first AI agent server 631.

The user may easily grasp who the provider of the voice recognition service is through the first indicator 810.

Thereafter, the user may move and then utter second voice <Tomorrow?> in front of the display device 100, as shown in FIG. 11.

The display device 100 may receive the second voice data corresponding to the second voice through the microphone (not shown) provided in the display device 100.

The display device 100 may transmit the received second voice data and the source identifier of the second voice data to the NLP server 630.

The source identifier may include one or more of a model name and name for identifying a device.

The NLP server 630 may determine the voice recognition service provider as the second AI agent server 633, based on the source identifier of the second voice data.

The NLP server 630 may convert the second voice data into the second text data and acquire the second intention through intention analysis of the second text data.

The NLP server 630 may determine the second intention as a search request for <tomorrow> through intention analysis.

The NLP server 630 may compare the second intention with the first intention obtained immediately before acquiring the second intention. The NLP server 630 may determine that the second intention is an interactive intention related to <tomorrow's weather>, because the first intention is a search request for <today's weather> and the second intention is a search request for <tomorrow's weather>.

That is, the NLP server 630 may reinterpret the second intention of the second voice <Tomorrow?> as a search request for the tomorrow's weather.

The NLP server 630 may acquire the second search result including the search information of the tomorrow's weather and transmit the acquired second search result to the display device 100.

The display device 100 may display the received second search result 1100 through the display unit 180.

Simultaneously, the display device 100 may further display a second indicator 830 indicating that the voice recognition service provider for the second voice is the second AI agent server 633 on the display unit 180. The second indicator 830 may identify the provider of the voice recognition service and may have various shapes such as text, an image or an icon.

The display device 100 may audibly output a notification indicating that the voice recognition service provider for the second voice is the second AI agent server 633.

The user may easily grasp the provider of the voice recognition service through the second indicator 830.

According to the embodiment of the present disclosure, even if the voice recognition service providers which have received the voices continuously uttered by the user are different, it is possible to organically output the voice recognition result.

Therefore, the user may receive the organic voice recognition service even if the user utters voice toward any device in the home, it is possible to greatly improve convenience.

Figure 12:
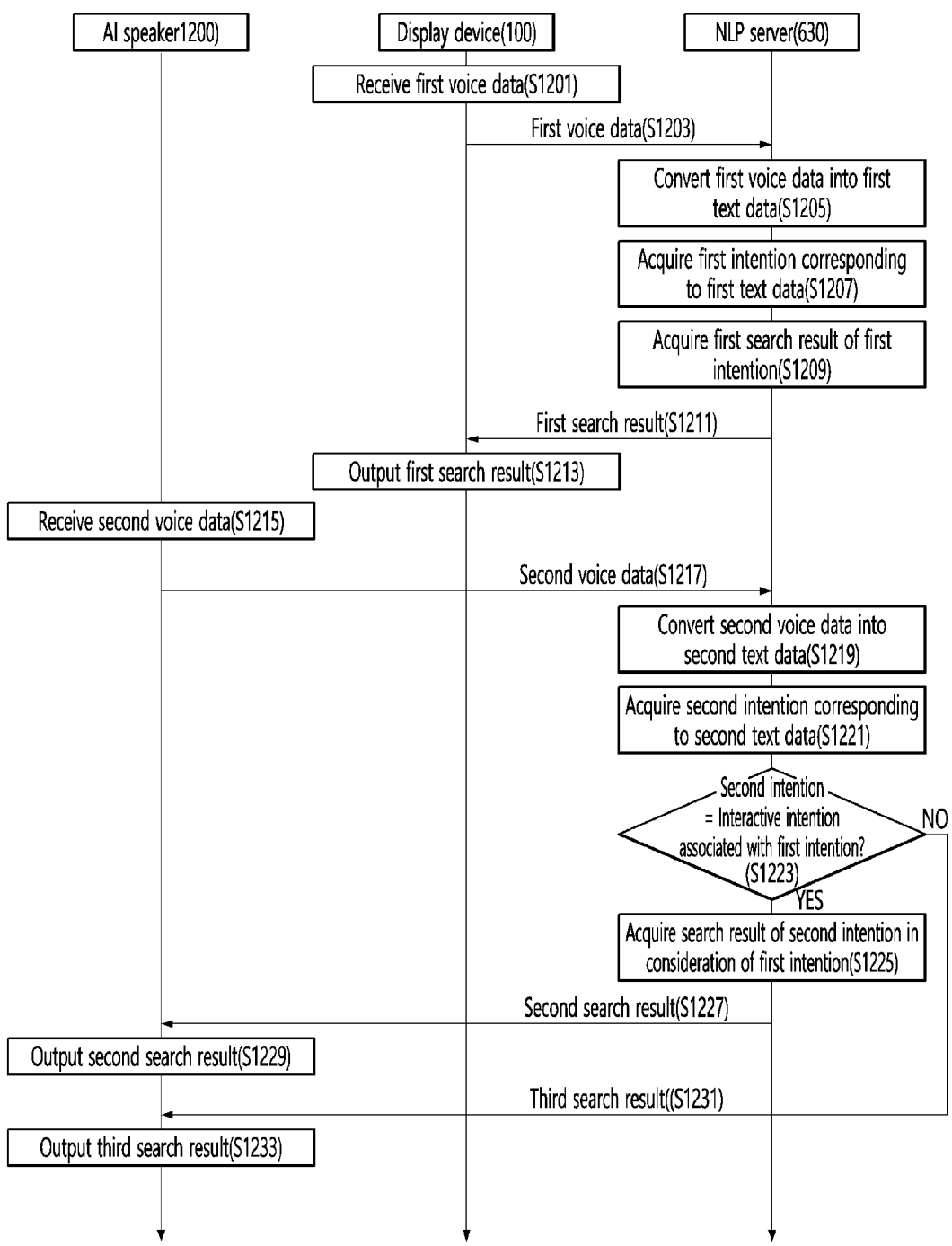
FIGS. 12 to 14 are views illustrating a process of providing an interactive voice recognition service when voice recognition service providers are different according to another embodiment of the present disclosure.
Figure 13:
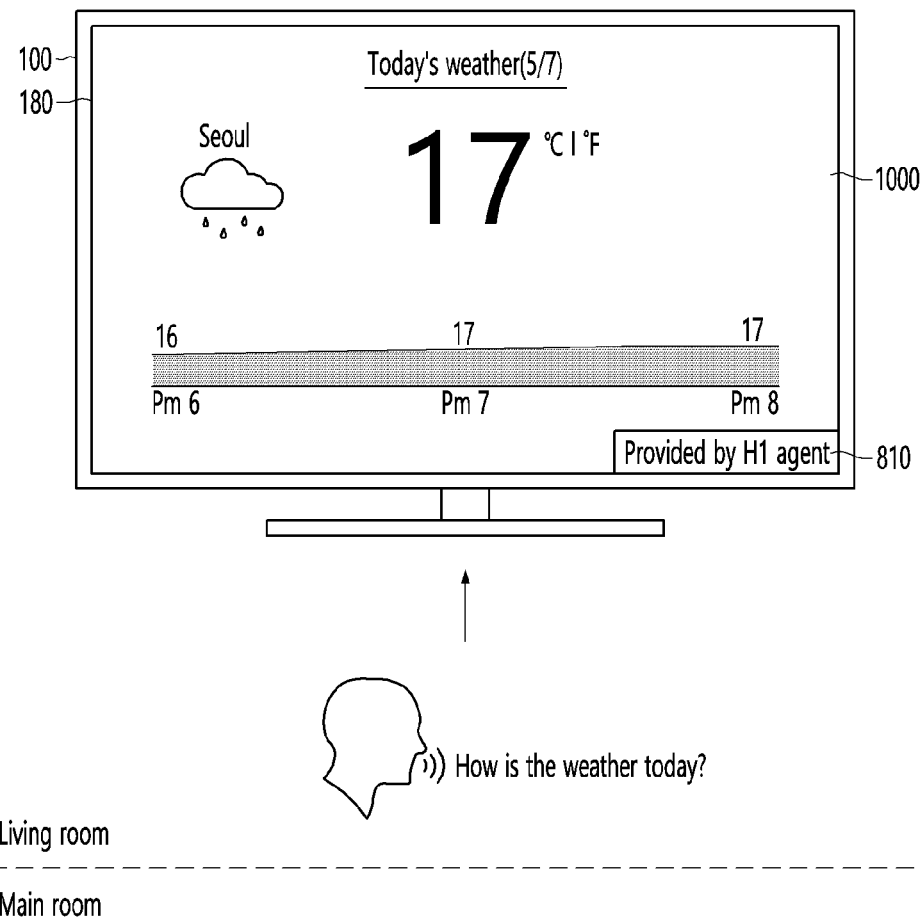
Figure 13:
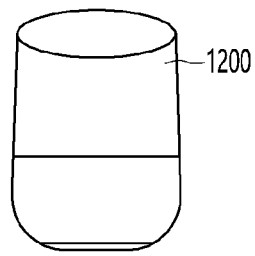
Figure 14:
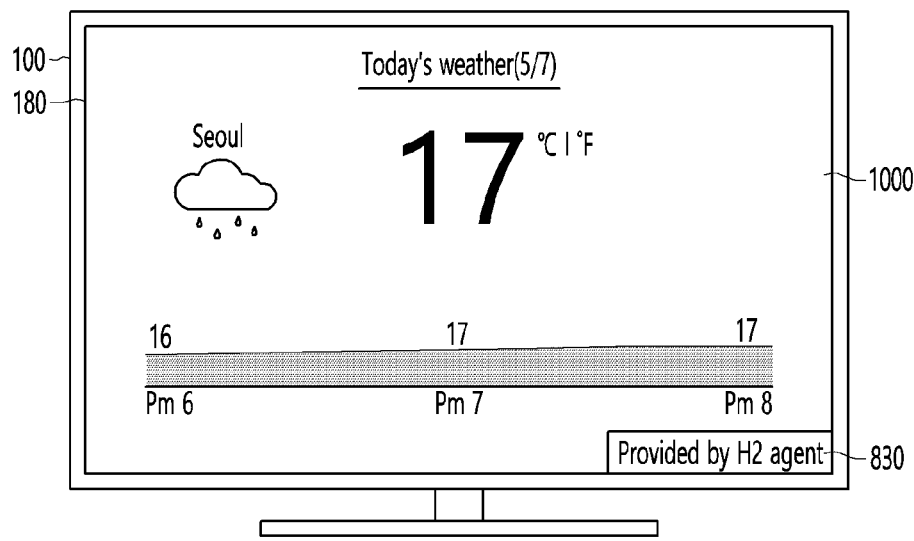
Figure 14:
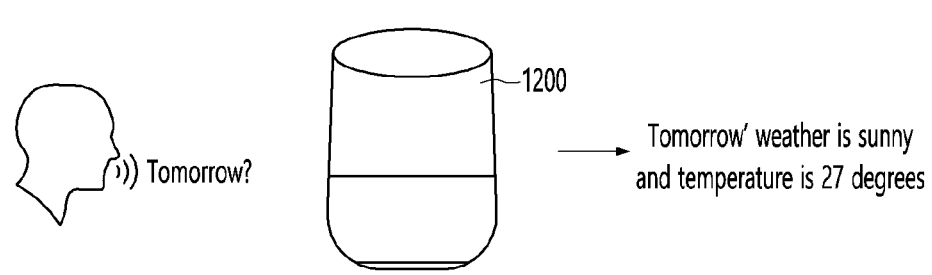

FIGS. 12 to 14 are views illustrating a process of providing an interactive voice recognition service when voice recognition service providers are different according to another embodiment of the present disclosure.

In FIGS. 12 to 14, it is assumed that an AI speaker 1201 is located in a main room and the display device 100 is located in a living room.

In addition, the AI speaker 1201 provides a voice recognition service through the first AI agent server 631, and the display device 100 provides a voice recognition service through the second AI agent server 633.

FIG. 12 is a ladder diagram illustrating a method of operating a voice recognition service system according to another embodiment of the present disclosure.

In the embodiment of FIG. 12, a detailed description of parts overlapping with those of FIG. 7 will be omitted.

The artificial intelligence (AI) speaker 1200 may be a speaker for audibly outputting a response to the voice uttered by the user without providing a display.

Referring to FIG. 12, the display device 100 receives the first voice data corresponding to the first voice uttered by the user through the microphone provided in the display device 100 (S1201), and transmits the received first voice data to the NLP server 630 (S1203).

The processor 66 of the NLP server 630 converts the first voice data into the first text data (S1205).

The processor 66 of the NLP server 630 acquires a first intention through intention analysis of the first text data (S1207).

The processor 66 of the NLP server 630 acquires a first search result for the acquired first intention (S1209).

The processor 66 of the NLP server 630 may acquire the first search result through the second AI agent server 633 matched with the display device 100.

The processor 66 of the NLP server 630 transmits the acquired first search result to the display device 100 through the communication unit 61 (S1211).

The processor 66 of the NLP server 630 may transmit the acquired first search result and a source for providing the first search result to the display device 100. The source for providing the first search result may include information for identifying the second AI agent server 633.

The display device 100 outputs the first search result received from the NLP server 630 (S1213).

The display device 100 may further output the first indicator indicating the voice recognition service provider which has provided the first search result, in addition to the first search result.

Thereafter, the AI speaker 1200 receives the second voice data corresponding to the second voice uttered by the user through the microphone provided in the AI speaker 1200 (S1215).

The AI speaker 1200 transmits the received second voice data to the NLP server 630 (S1217).

The processor 66 of the NLP server 630 converts the received second voice data into second text data (S1219).

The processor 66 of the NLP server 630 acquires the second intention corresponding to the second text data through intention analysis (S1221).

The processor 66 of the NLP server 630 determines whether the acquired second intention is an interactive intention associated with the first intention (S1223).

The processor 66 of the NLP server 630 acquires a second search result corresponding to the second intention in consideration of the first intention, upon determining that the acquired second intention is the interactive intention associated with the first intention (S1225).

The processor 66 of the NLP server 630 may acquire the second search result through the first AI agent server 631 which is the voice recognition service provider matched with the AI speaker 1200.

The processor 66 of the NLP server 630 transmits the second search result to the AI speaker 1200 through the communication unit 61 (S1227).

The processor 66 of the NLP server 630 may transmit the source for providing the second search result to the AI speaker 1200, in addition to the second search result. The source for providing the second search result may include information for identifying the first AI agent server 631.

The AI speaker 1200 audibly outputs the second search result received from the NLP server 630 (S1229).

The AI speaker 1200 may also audibly output the source for providing the second search result.

Meanwhile, the processor 66 of the NLP server 630 acquires a third search result in consideration of only the second intention upon determining that the acquired second intention is not the interactive intention associated with the first intention, and transmits the acquired third search result to the AI speaker 1200 (S1231).

The AI speaker 1200 outputs the received third search result (S1233).

The embodiment of FIG. 12 will be described through a user scenario.

Referring to FIG. 13, the user may utter first voice <How is the weather today?> in front of the display device 100 located in the living room.

The microphone of the display device 100 may receive the first voice <How is the weather today?> and transmit the first voice data corresponding to the first voice to the NLP server 630.

The display device 100 may transmit the received first voice data to the NLP server 630. The display device 100 may further transmit the source identifier of the first voice data (the identifier thereof) to the NLP server 630.

The NLP server 630 may determine the voice recognition service provider for the first voice data as the second AI agent server 633, based on the source identifier of the first voice data.

The NLP server 630 may convert the first voice data into the first text data and acquire the first intention through intention analysis of the first text data.

The NLP server 630 may determine the first intention as an information request for today's weather through intention analysis.

The NLP server 630 may acquire a first search result including information on today's weather and transmit the acquired first search result to the display device 100.

The display device 100 may display, on the display unit 180, the first search result 1000 including the information on the today's weather from the NLP server 630.

Meanwhile, the display device 100 may further display a first indicator 810 indicating that the voice recognition service provider for the first voice is the first AI agent server 631 on the display unit 810. The first indicator 810 may identify the provider of the voice recognition service and may have various shapes such as text, an image or an icon.

Thereafter, the user may move and then utter second voice <Tomorrow?> in front of the AI speaker 1200 located in the main room, as shown in FIG. 14.

The AI speaker 1200 may receive the second voice data corresponding to the second voice through the microphone (not shown) provided in the AI speaker 1200.

The display device 100 may transmit the received second voice data and the source identifier of the second voice data to the NLP server 630.

The NLP server 630 may determine the voice recognition service provider as the second AI agent server 633, based on the source identifier of the second voice data.

The NLP server 630 may convert the second voice data into the second text data and acquire the second intention through intention analysis of the second text data.

The NLP server 630 may determine the second intention as a search request for tomorrow through intention analysis.

The NLP server 630 may compare the second intention with the first intention obtained immediately before acquiring the second intention. The NLP server 630 may determine that the second intention is an interactive intention related to tomorrow' weather, because the first intention is a search request for today's weather and the second intention is a search request for tomorrow.

That is, the NLP server 630 may reinterpret the second intention as a search request for the tomorrow's weather, because the second intention is associated with the first intention in terms of time.

The NLP server 630 may acquire the second search result including the search information of the tomorrow's weather and transmit the acquired second search result to the AI speaker 1200.

The AI speaker 1200 may audibly output the acquired second search result.

Conventionally, an interactive voice recognition service was possible only in an environment in which a user interface (UI) is displayed, like weather information.

However, according to the embodiment of the present disclosure, even in the case of an action requiring a UI, an interactive voice recognition service may be provided to a device which cannot display the UI, such as the AI speaker 1200.

Therefore, user's interactive utterance for search is possible even in the case of a voice recognition device without a display, thereby improving a voice recognition service provision environment.

Figure 15:
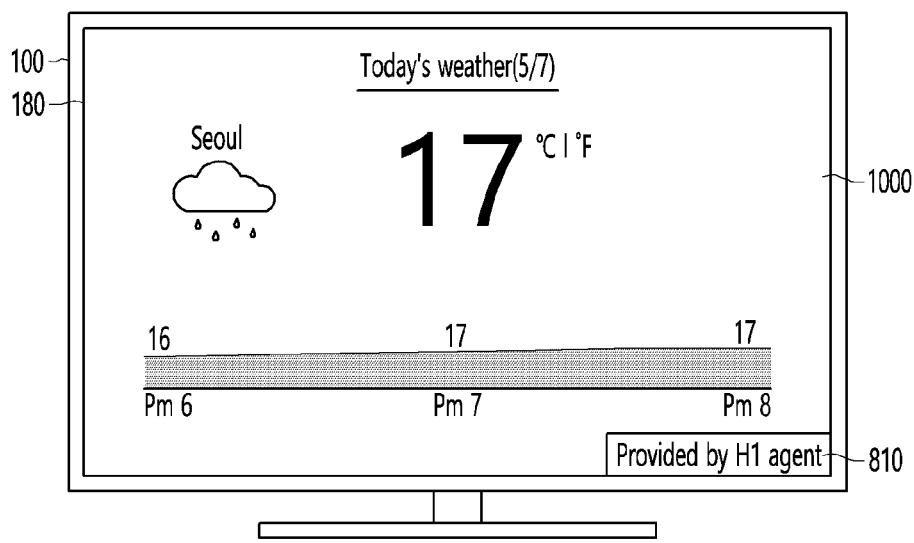
FIG. 15 is a view illustrating an example of providing a search result in consideration of only the intention of second voice when the intention of subsequent voice is not an interactive connection intention.
Figure 15:
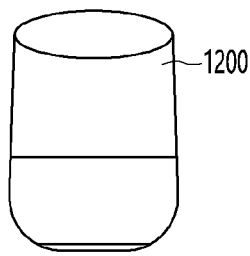

FIG. 15 is a view illustrating an example of providing a search result in consideration of only the intention of second voice when the intention of subsequent voice is not an interactive connection intention.

The scenario of FIG. 15 may be performed after the embodiment of FIG. 13.

The AI speaker 1200 located in the main room may receive voice data corresponding to voice <Who is AA?> uttered by the user.

The AI speaker 1200 may transmit voice data and a source identifier to the NLP server 630.

The NLP server 630 may convert the voice data into text data and acquire an intention through intention analysis of the text data.

The NLP server 630 may determine that the intention of the voice is a search request for the person <AA> through intention analysis.

The NLP server 630 may determine that the intention obtained immediately before is a search request for today's weather and the intention obtained thereafter is a search request for the person <AA>.

The NLP server 630 may determine that the newly obtained intention is not an interactive connection intention, because the today's weather is not associated with the information on the specific person.

The NLP server 630 may acquire person search information in consideration of only the search intention for the person <AA>. The NLP server 630 may transmit the acquired person search information to the AI speaker 1200.

The AI speaker 1200 may audibly output search information including the age, nationality and occupation of the person <AA> from the NLP server 630.

According to various embodiments of the present disclosure, a user can naturally and continuously search for information even if the user utters toward different devices and thus feel an improved experience for information search.

According to various embodiments of the present disclosure, interactive utterances are possible regardless of voice recognition service providers of devices provided in the home, thereby greatly improving convenience of utterance.

According to an embodiment of the present disclosure, the above-described method may be embodied as a processor readable code on a medium in which a program is recorded. Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. An artificial intelligence device comprising:
   a communication interface configured to perform communication with a first peripheral device and a second peripheral device; and
   a processor configured to:
   obtain, from the first peripheral device, first voice data corresponding to a first utterance issued by a user and a first device identification information for identifying the first peripheral device,
   determine, based on the first device identification information, a first voice recognition service provider as a voice recognition service provider for providing a voice recognition service among a plurality of voice recognition service providers,
   transmit the first voice data to the determined first voice recognition service provider,
   obtain, from the first voice recognition service provider, a first analysis result of a first intention corresponding to the obtained first voice data,
   output the first analysis result to the first peripheral device,
   obtain, from the second peripheral device, second voice data corresponding to a second voice uttered by the user and a second device identification information for identifying the second peripheral device,
   determine, based on the second device identification information, a second voice recognition service provider as a voice recognition service provider for providing the voice recognition service among the plurality of voice recognition service providers,
   transmit the second voice data to the determined second voice recognition service provider matched with the second peripheral device, wherein the second voice recognition service provider is a different voice recognition service provider than the first voice recognition service provider such that each voice recognition service provider generates a respective primary analysis result using a primary analysis result from a respective primary intent of the other voice recognition service provider,
   based on a second intention corresponding to the obtained second voice data being an interactive intention associated with a first intention, obtain, from the second voice recognition service provider, a second analysis result based on the first intention and the second intention corresponding to the obtained second voice data, and
   cause an output of the second analysis result to the second intention.

2. The artificial intelligence device of claim 1, wherein the processor is further configured to obtain the second analysis result for the obtained second intention in consideration of the obtained first intention and to transmit the obtained second analysis result to the second peripheral device.

3. The artificial intelligence device of claim 2, wherein the processor is further configured to obtain a third analysis result in consideration of the obtained second intention without considering the obtained first intention and to transmit the obtained third analysis result to the second peripheral device based on a determination that the obtained second intention is not the interactive intention associated with the obtained first intention.

4. The artificial intelligence device of claim 1, wherein the processor is further configured to transmit the first analysis result or the second analysis result and a source for identifying the determined voice recognition service provider to each peripheral device.

5. The artificial intelligence device of claim 1, wherein the processor is further configured to:
   convert the obtained first voice data into first text data, wherein the first intention is obtained through an intention analysis of the converted first text data, and
   convert the obtained second voice data into second text data, and
   obtain the second intention through intention analysis of the converted second text data.

* * * * *